United States Patent Office 3,833,537
Patented Sept. 3, 1974

3,833,537
OXIDATIVELY STABLE POLYCARBONATE COMPOSITION
Donald B. G. Jaquiss, New Harmony, Ind., assignor to General Electric Company
No Drawing. Continuation-in-part of abandoned application Ser. No. 265,339, June 22, 1972. This application Mar. 27, 1973, Ser. No. 345,446
Int. Cl. C08f 45/58; C08g 51/58
U.S. Cl. 260—45.8 A    4 Claims

ABSTRACT OF THE DISCLOSURE

An oxidatively stable aromatic polycarbonate composition which is stabilized against degradation due to elevated temperatures by employing therewith a material which may be either a heavy metal salt of hypophosporous acid or the metal salt of hypophosphorous acid in combination with a particular epoxy compound. The amount of the metal salt of the hypophosphorous acid employed herein can range from about 0.005 to about 2.0 weight percent and the amount of epoxy can range from 0.01 to 1.0 weight percent all based on the weight of the aromatic polycarbonate composition.

This invention is directed to a thermal-oxidatively stable aromatic polycarbonate composition stabilized against thermal oxidative degradation with a heavy metal salt of a hypophosphorous acid or a metal salt of hypophosphorous acid with an epoxy compound.

This application is a continuation-in-part of application Ser. No. 265,339, filed June 22, 1972, and now abandoned.

BACKGROUND OF THE INVENTION

In the past, much effort has been expended in preparing thermally stable polycarbonate compositions which would be stable at elevated temperatures and particularly at the high molding temperatures generally employed to prepare molded polycarbonate shapes. Many additives have been successfully employed to achieve this end. Particularly useful, for example, are the organic phosphites disclosed in U.S. Pat. 3,305,520 wherein the organic phosphites are used in admixture with a polycarbonate to stabilize the polycarbonate. In addition, other stabilizer additives have been found useful such as tetra aryl-tin compounds with phosphites as disclosed in Canadian Patent 727,700. However, as shown in U.S. Pat. 3,305,520, the phosphites employed therein are triaryl or trialkyl phosphites and are used to stabilize polycarbonates. The use of these phosphites, while better than no additive does suffer from certain drawbacks particularly heat aging of compositions containing such phosphites. The ability of a polymer to withstand degradation upon repeated exposure to elevated temperatures or upon sustained exposure to elevated temperatures is becoming more critical. Therefore, it has been found that the above drawbacks can be overcome by employing particular salts of hypophosphorous acid with a carbonate polymer.

Therefore, it is an object of this invention to provide a thermal-oxidatively stable polymeric composition.

Another object of this invention is to provide a thermal-oxidatively stable polycarbonate composition stabilized with a particular salt of a hypophosphorous acid.

Still another object of this invention is to provide a thermal-oxidatively stable polycarbonate composition stabilized with a particular salt of a hypophosphorous acid and an epoxy compound.

These and other objects of this invention will become apparent from the following detailed description thereof.

DESCRIPTION OF THE INVENTION

According to this invention, the foregoing and other objects are obtained by stabilizing a polycarbonate with a minor amount of a particular salt of hypophosphorous acid which may also have in combination therewith an epoxy compound. The amount of the salt that may be employed can vary from 0.005 to about 2.0 weight percent. An epoxy compound may be employed in amounts of from about 0.01 to about 1.0 weight percent. The salts of hypophosphorous acid which can be employed herein are magnesium hypophosphite, barium hypophosphite, calcium hypophosphite, manganese hypophosphite, sodium hypophosphite, potassium hypophosphite, lithium hypophosphite, etc. and the heavy metal salts of hypophosphorous acid such as nickel hypophosphite, zinc hypophosphite, etc.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

Example I

To an aromatic polycarbonate prepared by reacting equimolar amounts of 2,2-bis(4-hydroxyphenyl) propane and phosgene in an organic medium containing a molecular weight regulator and an acid acceptor, add 0.03 weight percent of calcium hypophosphite based on the weight of the polycarbonate. The mixture is then fed to an extruder which is at a temperature of about 525° F. and the extrudate is chopped into pellets.

Example II

Example I is repeated except that 0.01 weight percent of calcium hypophosphite is employed herein.

Example III

Example I is repeated except that 0.01 weight percent of magnesium hypophosphite and 0.1 weight percent of 3,4-epoxycyclohexylmethyl, 3,4-epoxycyclohexane carboxylate are employed herein.

Example IV

Example I is repeated except that 0.2 weight percent of zinc hypophosphite with 1.0 weight percent of titanium dioxide are employed herein.

Example V

Example I is repeated except that 0.01 weight percent of calcium hypophosphite and 0.05 weight percent of 3,4-epoxycyclohexylmethyl, 3,4-epoxycyclohexane carboxylate are employed herein.

Example VI

Example IV is repeated except that 0.1 weight percent of a phosphite consisting of one part of didecylphenyl phosphite, one part of triphenyl phosphite, and two parts of diphenyldecyl phosphite are employed herein in place of the zinc hypophosphite.

Example VII

Each of the polymer compositions of Examples I–V are injection molded into test specimens at 600 and 680° F. respectively. Test specimens are also heat aged at 284°

F. for seven days. Each of the test specimens are then measured for discoloration in accordance with ASTM Yellowness Index Test D1925–63T. The lower the Yellowness Index number, the lower the discoloration of the polymer and the better is the thermal stability of the polymer composition. As a control, the polycarbonate prepared as in Example I without the calcium hypophosphite along with an additional control containing titanium dioxide is used. The results obtained are the average of five test specimens for each result and they are as follows:

TABLE I.—YELLOWNESS INDEX

| Specimen | As molded | | Heat aging at 284° F. for 7 days | |
|---|---|---|---|---|
| | 600° F. | 680° F. | 600° F. | 680° F. |
| I | 4.4 | 4.2 | 6.5 | 7.9 |
| II | 4.4 | 4.5 | 7.0 | 8.8 |
| III | 4.3 | 4.5 | 6.8 | 7.9 |
| IV | 5.5 | 2.9 | 8.8 | 10.2 |
| V | 4.0 | 4.4 | 5.8 | 6.8 |
| VI | 8.7 | 7.3 | 12.0 | 13.6 |
| Control | 5.8 | 9.1 | 9.2 | 13.9 |
| Control plus 1% titanium dioxide | 13.7 | 15.9 | 17.2 | 17.9 |

The instant invention is directed to a thermal-oxidatively stable aromatic polycarbonate composition stabilized against degradation due to exposure to elevated temperatures with a minor amount of either a heavy metal salt of hypophosphorous acid or a metal salt of hypophosphorous acid in combination with an epoxy compound of the formula:

I.

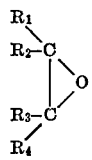

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms, and

II.

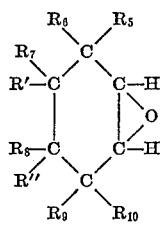

wherein $R_5$, $R_6$, $R_7$, $R_8$, $R_9$ and $R_{10}$ are independently selected from the group consisting of hydrogen, alkyl and substituted alkyl radicals of 1–24 carbon atoms and wherein the substituent on the alkyl radical can additionally include therein another oxirane ring, and further wherein R' and R" are independently selected from the group consisting of hydrogen and —COOR; said R being selected from the group consisting of alkyl, cycloalkyl and aryl radicals of 1–24 carbon atoms. While the actual number of hydrogen atoms employed may vary, it should be a function of the volatility of the epoxy compound. The number of hydrogen atoms should be such as to minimize the volatility of the epoxy compound since if the epoxy compound were to volatilize at a low temperature, its benefit in use with a polycarbonate would be lost at the molding temperatures employed in preparing molded articles from the composition of this invention. Preferably, in the practice of this invention, the metal salt of hypophosphorous acid employed herein is calcium hypophosphite.

The metal salts of hypophosphorous acid employed herein are typified as such compounds as sodium hypophosphite, potassium hypophsophite, barium hypophosphite, calcium hypophosphite, manganese hypophosphite, magnesium hypophosphite and the heavy metal salts of hypophosphorous acid are typified as such compounds as zinc hypophosphite, nickel hypophosphite, etc. Preferably, the metal salts of hypophosphorous acid are added at the end of the reaction for producing polycarbonates.

The epoxy composition employed in the practice of this invention has the following formula:

I.

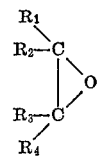

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms, and

II.

wherein $R_5$, $R_6$, $R_7$, $R_8$, $R_9$ and $R_{10}$ are independently selected from the group consisting of hydrogen, alkyl and substituted alkyl radicals of 1–24 carbon atoms and wherein the substituent on the alkyl radical can additionally include therein another oxirane ring, and further wherein R' and R" are independently selected from the group consisting of hydrogen and —COOR; said R being selected from the group consisting of alkyl, cycloalkyl and aryl radicals of 1–24 carbon atoms. While the actual number of hydrogen atoms employed may vary, it should be a function of the volatility of the epoxy compound. The number of hydrogen atoms should be such as to minimize the volatility of the epoxy compound since if the epoxy compound were to volatilize at a low temperature, its benefit in use with a polycarbonate would be lost at the molding temperatures employed in preparing molded articles from the composition of this invention.

The amount of epoxy employed in the practice of this invention can vary from 0.01 to 1.0 weight percent based on the weight of the polymer composition and is preferably 0.03 to 0.50 weight percent. While more than 1.0 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxy-cyclohexylmethyl 3,4-epoxy cyclohexane carboxylate with essentially the same results as those set forth previously as encompassed by the formulas I and II and are 3,4-epoxy-6-methylcyclohexylmethyl, 3,4 - epoxy-6-methylcyclohexane carboxylate, 2,3 - epoxycyclohexylmethyl 3,4 epoxycyclohexane carboxylate, 4-(3,4-epoxy-5-methylcyclohexyl) butyl 3,4-epoxycyclohexane carboxylate, 3,4-epoxy-cyclohexyl ethylene oxide, cyclohexylmethyl 3,4-epoxy-cyclohexane carboxylate, 3,4-epoxy-6-methylcyclohexylmethyl-6-methylcyclohexyl carboxylate, bisphenol-A diglycidyl ether, tetrabromobisphenol-A diglycidyl ether, diglycidyl ester of phthalic acid, diglycidyl ester of hexahydrophthalic acid, bis-epoxy dicyclopentadienyl ether or ethylene glycol, epoxidized soybean oil, epoxidized linseed oil, bis-epoxycyclohexyl adipate, butadiene diepoxide, tetraphenylethylene epoxide, octyl epoxy tallate and epoxidized polybutadiene. Also, 3,4-dimethyl-1,2-epoxy cyclohexane, 3,5-dimethyl-1,2-epoxy cyclohexane, 3-methyl-5-*tert* butyl-1,2-epoxy cyclohexane, octadecyl 2,2-dimethyl-3,4-epoxy cyclohexane carboxylate, N-butyl 2,2-dimethyl-3,4-epoxy cyclohexane carboxylate, cyclohexyl 2-methyl-3,4-epoxy cyclohexane carboxylate, N-butyl 2-isopropyl-3,4-epoxy-5-methyl-cyclohexane carboxylate, octadecyl-3,4-epoxy cyclohexane carboxylate, 2 ethyl hexyl 3',4' epoxy cyclohexane carboxylate, 4,6 dimethyl 2,3 epoxy cyclohexyl 3',4'-epoxy cyclohexane carboxylate, 4,5 epoxytetrahydro phthalic-anhydride, 3-*tert*-butyl-4,5-epoxytetrahydro phthalic anhydride, diethyl 4,5-epoxy-cis-1,2 cyclohexane dicarboxylate, di-n-butyl 3-*tert*-butyl-4,5-epoxy-cis-1,2 cyclohexane dicarboxylate. Specifically, any of the epoxycyclohexyl compounds meet the general formula of II and the other epoxy compounds recited herein meet the general formula of I. Preferably, the epoxy compound employed in the practice of this invention is 3,4-epoxy cyclohexylmethyl 3,4-epoxy cyclohexane carboxylate.

The process for preparing the polymeric composition of this invention comprises reacting a dihydric phenol with a carbonate precursor in the presence of an acid acceptor and a molecular weight regulator.

The dihydric phenols that can be employed herein to prepare the copolymer of this invention are bisphenols such as bis(4-hydroxyphenyl)-methane, 2,2-bis(4-hydroxyphenyl)-propane, 2,2 - bis(4 - hydroxy - 3 - methylphenyl)-propane, 4,4-bis(4-hydroxyphenyl)-heptane, 2,2-bis(4-hydroxy 3,5-dichlorophenyl)-propane, 2,2-bis (4-hydroxy 3,5-dibromophenyl)-propane, etc., dihydric phenol ethers such as bis(4-hydroxyphenyl)-ether, bis-(3,5-dichloro-4-hydroxyphenyl)-ether, etc., dihydroxydiphenyls such as p,p'-dihydroxydiphenyl, 3,3'-dichloro-4,4'-dichloro-4,4'-dihydroxydiphenyl, etc. dihydroxyaryl sulfones such as bis(4-hydroxyphenyl)-sulfone, bis(3,5-dimethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4 - dihydroxy-3-methylbenzene, etc., and dihydroxy diphenyl sulfoxides such as bis(4-hydroxyphenyl)-sulfoxide, bis(3,5-dibromo-4-hydroxyphenyl)-sulfoxide, etc. A variety of additional dihydric phenols are also available to provide carbonate polymers and are disclosed in U.S. Pats. 2,999,835; 3,028,365 and 3,153,008. It is of course possible to employ two or more different dihydric phenols or a copolymer of a dihydric phenol with glycol or with hydroxy or acid terminated polyester or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarybutylphenol is employed as the molecular weight regulator.

The polymer composition of this invention may have also included therewith such other materials as pigments (colorants), fillers, etc. As shown from the examples, the additive of the instant invention greatly enhances the thermal stability of compositions containing pigments such as titanium dioxide.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermal-oxidatively stable aromatic polycarbonate composition stabilized against degradation due to elevated temperatures with 0.005 to about 2.0 weight percent of a metal salt of hypophosphorous acid and 0.01 to 1.0 weight percent of an epoxy compound selected from the group consisting of:

I.

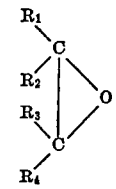

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms, and

II.

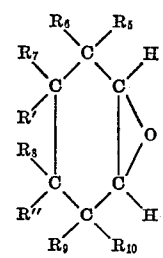

wherein $R_5$, $R_6$, $R_7$, $R_8$, $R_9$ and $R_{10}$ are independently selected from the group consisting of hydrogen, alkyl and substituted alkyl radicals of 1–24 carbon atoms and wherein the substituent on the alkyl radical can additionally include therein another oxirane ring, and further wherein R' and R'' are independently selected from the group consisting of hydrogen and —COOR; said R being selected from the group consisting of alkyl, cycloalkyl and aryl radicals of 1–24 carbon atoms.

2. The composition of claim 1 wherein the metal salt of hypophosphorous acid is calcium hypophosphite.

3. The composition of claim 1 wherein the epoxy compound is an epoxidized cycloaliphatic compound.

4. The composition of claim 3 wherein the epoxy compound is 3,4-epoxy-cyclohexylmethyl, 3,4-epoxycyclohexane carboxylate.

References Cited

UNITED STATES PATENTS

| | | | |
|---|---|---|---|
| 3,464,953 | 9/1969 | Newland | 260—45.75 N |
| 3,467,683 | 9/1969 | Harson et al. | 260—45.75 C |
| 3,201,369 | 8/1965 | Dell et al. | 260—45.7 P |
| 2,510,777 | 6/1950 | Gray | 260—45.7 P |
| 3,242,134 | 3/1966 | Papero | 260—45.7 P |
| 3,305,520 | 2/1967 | Fritz et al. | 260—45.7 P |
| 3,330,802 | 7/1967 | Ciceri et al. | 260—45.7 P |
| 3,489,716 | 1/1970 | Calkins | 260—45.7 P |
| 3,498,946 | 3/1970 | Calkins | 260—45.7 P |
| 3,525,706 | 8/1970 | Calkins | 260—45.7 P |
| 3,634,312 | 1/1972 | Babillis et al. | 260—45.8 A |
| 3,729,440 | 4/1973 | Liberty | 260—45.7 P |

DONALD E. CZAJA, Primary Examiner

RONALD W. GRIFFIN, Assistant Examiner

U.S. Cl. X.R.

260—45.7 P, 45.75 N, 45.75 R